United States Patent
Tsuchiya et al.

(10) Patent No.: US 11,807,796 B2
(45) Date of Patent: Nov. 7, 2023

(54) HEAT TRANSPORT DEVICE AND HEAT TRANSPORT METHOD USING SAME

(71) Applicant: DAIKIN INDUSTRIES, LTD., Osaka (JP)

(72) Inventors: Tatsumi Tsuchiya, Osaka (JP); Kouhei Koba, Osaka (JP); Masaru Tanaka, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 449 days.

(21) Appl. No.: 16/465,911

(22) PCT Filed: Oct. 31, 2017

(86) PCT No.: PCT/JP2017/039252
§ 371 (c)(1),
(2) Date: May 31, 2019

(87) PCT Pub. No.: WO2018/105271
PCT Pub. Date: Jun. 14, 2018

(65) Prior Publication Data
US 2021/0284891 A1  Sep. 16, 2021

(30) Foreign Application Priority Data

Dec. 9, 2016  (JP) ................................ 2016-239242

(51) Int. Cl.
*C09K 5/04*  (2006.01)
*F25B 43/00*  (2006.01)
(Continued)

(52) U.S. Cl.
CPC ............... *C09K 5/044* (2013.01); *C09K 5/04* (2013.01); *C09K 5/041* (2013.01); *F25B 1/053* (2013.01);
(Continued)

(58) Field of Classification Search
CPC . C09K 5/02; C09K 5/04; C09K 5/041; C09K 5/044; C09K 5/045; C09K 2205/10;
(Continued)

(56) References Cited

U.S. PATENT DOCUMENTS 5,813,240 A * 9/1998 Sato ...................... F25B 43/043
62/85
9,303,198 B2 * 4/2016 Tsuchiya ................ C09K 5/045
(Continued)

FOREIGN PATENT DOCUMENTS

CN          1404569       3/2003
CN          101687937     3/2010
(Continued)

OTHER PUBLICATIONS

International Search Report dated Jan. 30, 2018 in International (PCT) Application No. PCT/JP2017/039252.
(Continued)

*Primary Examiner* — Matthew R Diaz
(74) *Attorney, Agent, or Firm* — Wenderoth, Lind & Ponack, L.L.P.

(57) ABSTRACT

The position of the stabilizer container 7 in the circulation route is not limited. The stabilizer container 7 is preferably disposed between the evaporator and the condenser between which the refrigerant flows in the circulation route as a liquid refrigerant. Specifically, the stabilizer container 7 is preferably disposed between the outdoor heat exchanger 4 and the expansion mechanism 5 or between the indoor heat exchanger 6 and the expansion mechanism 5. During cooling, the outdoor heat exchanger 4 functions as a condenser and the indoor heat exchanger 6 functions as an evaporator. During heating, the outdoor heat exchanger 4 functions as an evaporator and the indoor heat exchanger 6 functions as a condenser. In either case of cooling or heating, the liquid (Continued)

refrigerant is present between the expansion mechanism 5 and the outdoor heat exchanger 4 or between the expansion mechanism 5 and the indoor heat exchanger 6 depending on the refrigerant circulation direction, and the stabilizer container 7 is located where the liquid refrigerant is present (i.e., between the expansion mechanism and whichever heat exchanger 4, 6 serves as the evaporator in the refrigerant circulation direction). Thus, as the liquid refrigerant passes through the stabilizer container 7, oxidation of the refrigerant can be efficiently prevented and acids in the circulation route can be efficiently scavenged.

10 Claims, 2 Drawing Sheets

(51) Int. Cl.
    *F25B 1/053*     (2006.01)
    *F25B 11/00*     (2006.01)

(52) U.S. Cl.
    CPC .............. *F25B 11/00* (2013.01); *F25B 43/00* (2013.01); *C09K 2205/10* (2013.01); *C09K 2205/102* (2013.01); *C09K 2205/126* (2013.01)

(58) Field of Classification Search
    CPC ........ C09K 2205/102; C09K 2205/104; C09K 2205/108; C09K 2205/12; C09K 2205/126; C09K 2205/132
    See application file for complete search history.

(56) References Cited

U.S. PATENT DOCUMENTS

| | | | |
|---|---|---|---|
| 9,587,202 B2* | 3/2017 | Bouvier | C09K 5/045 |
| 9,816,740 B1* | 11/2017 | Amundsen | F25B 43/00 |
| 2003/0140649 A1 | 7/2003 | Suzuki et al. | |
| 2009/0283712 A1 | 11/2009 | Zyhowski et al. | |
| 2011/0079040 A1* | 4/2011 | Morimoto | F25B 43/003 |
| | | | 165/61 |
| 2011/0312101 A1 | 12/2011 | Tsuchiya et al. | |
| 2014/0260252 A1* | 9/2014 | Zyhowski | C09K 5/044 |
| | | | 60/651 |
| 2015/0152749 A1* | 6/2015 | Nishiguchi | C09K 5/045 |
| | | | 60/651 |
| 2016/0040918 A1* | 2/2016 | Appler | C09K 5/041 |
| | | | 62/292 |
| 2016/0377326 A1* | 12/2016 | Masaki | C09K 5/044 |
| | | | 62/56 |
| 2017/0146271 A1* | 5/2017 | Hasegawa | F25B 1/053 |
| 2017/0335230 A1* | 11/2017 | Matsumoto | C09K 5/044 |
| 2018/0066871 A1* | 3/2018 | Matsukura | C09K 5/041 |
| 2018/0135893 A1* | 5/2018 | Miyoshi | F25B 41/20 |
| 2018/0164007 A1* | 6/2018 | Tsuboe | F25B 13/00 |

FOREIGN PATENT DOCUMENTS

| | | | | |
|---|---|---|---|---|
| CN | 102333839 | | 1/2012 | |
| CN | 104675460 | | 6/2015 | |
| CN | 105062427 | | 11/2015 | |
| EP | 2 339 271 | | 6/2011 | |
| EP | 3 410 038 | | 12/2018 | |
| JP | 58-46071 | | 3/1983 | |
| JP | 2009-270797 | | 11/2009 | |
| JP | 2010-121927 | | 6/2010 | |
| JP | 2014-211157 | | 11/2014 | |
| JP | 2016-33348 | | 3/2016 | |
| JP | 2016033348 A | * | 3/2016 | ............. F25B 1/053 |
| JP | 2016-194377 | | 11/2016 | |
| KR | 2006122503 A | * | 11/2006 | |
| WO | WO-0250482 A1 | * | 6/2002 | ............. F25B 9/008 |
| WO | 2008/027511 | | 3/2008 | |
| WO | 2009/003165 | | 12/2008 | |
| WO | 2011/087825 | | 7/2011 | |
| WO | 2015/130589 | | 9/2015 | |
| WO | WO-2016080149 A1 | * | 5/2016 | ............. C09K 5/044 |
| WO | WO-2016189717 A1 | * | 12/2016 | ............. F25B 13/00 |

OTHER PUBLICATIONS

Extended European Search Report dated Jun. 26, 2020 in corresponding European Patent Application No. 17878982.2.

* cited by examiner

HEAT TRANSPORT DEVICE AND HEAT TRANSPORT METHOD USING SAME

TECHNICAL FIELD

The present invention relates to a heat transport device and a heat transport method using the heat transport device.

BACKGROUND ART

Hydrofluorocarbons (HFCs), such as HFC-125 and HFC-32, have been widely used as important substitutes for chlorofluorocarbons (CFCs), hydrochlorofluorocarbons (HCFCs), etc., which are known as substances that deplete the ozone layer. Known examples of such substitutes include "HFC-410A," which is a mixture of HFC-32 and HFC-125; "R-404A," which is a mixture of HFC-125, HFC-134a, and HFC-143a; etc.

The above substitutes have various applications, such as heat transfer media, refrigerants, foaming agents, solvents, cleaning agents, propellants, and fire extinguishers, and are consumed in large amounts. However, since these substances have a global warming potential (GWP) several thousand times higher than that of $CO_2$, many people are concerned that their diffusion may greatly affect global warming.

As a global warming countermeasure, the substances are collected after being used; however, not all of them can be collected, and their diffusion due to leakage cannot be disregarded. For use in refrigerants or heat transfer media, although $CO_2$ and hydrocarbon-based substances have been considered as substituents, $CO_2$ refrigerants have many difficulties, such as insufficient refrigeration efficiency and the requirement of large equipment. Hydrocarbon-based substances also pose safety problems due to their high flammability.

Hydrofluoroolefins with a low GWP are recently attracting attention as substances that can solve these problems. Hydrofluoroolefin is a generic name for unsaturated hydrocarbons containing hydrogen and halogen (e.g., fluorine and chlorine), and includes substances represented by the following chemical formulae. The description in parentheses following each chemical formula indicates the refrigerant number typically used in the field of refrigerants.

$CF_3CF=CF_2$(HFO-1216yc), $CF_3CF=CHF$(HFO-1225ye), $CF_3CF=CH_2$(HFO-1234yf), $CF_3CH=CHF$(HFO-1234ze), $CF_3CH=CH_2$(HFO-1243zf)

$CF_3CCl=CH_2$(HCFO-1233xf), $CF_2ClCCl=CH_2$(HCFO-1232xf), $CF_3CH=CHCl$(HCFO-1233zd), $CF_3CCl=CHCl$(HCFO-1223xd), $CClF_2CCl=CHCl$(HCFO-1222xd), $CFCl_2CCl=CH_2$(HCFO-1231xf), and $CH_2ClCCl=CCl_2$(HCO-1230xa).

Of these, fluoropropenes are particularly promising substances as candidates for low GWP refrigerants or heat transfer media; however, since these compounds have a lower global warming potential than saturated HFC compounds, the stability in the atmosphere is expected to be poor as compared to the saturated HFC compounds. Accordingly, these substances have a problem of gradually reducing performance depending on the situation or environment when used in various applications. The performance is particularly reduced when air (oxygen) is entrapped in a refrigerant.

In general, in mobile air conditioners or like devices to which a refrigerant is charged at the factory under construction management, there is little possibility of an air (oxygen) entrapment problem. However, stationary air conditioners or like devices are required to be charged with a refrigerant on site. The charging of the refrigerant relies on the contractor's management ability. Thus, entrapped air (oxygen) has been considered to be a primary cause of failures and problems, such as reduction of refrigeration capacity. Additionally, by using a magnetic bearing, a ceramic bearing, or an air bearing as a bearing that supports the axis of a motor driving a compression part that compresses a refrigerant in a compressor, an oil-free device has been recently developed in which the amount of the refrigerant oil to be used is limited to 5 parts by weight or less per 100 parts by weight of the refrigerant. This device can reduce costs and maintenance load involving the exchange of refrigerant oil, and can avoid dissolution of the refrigerant oil into the atmosphere. However, as compared to devices using refrigerant oil, oil-free devices are likely to entrap air (oxygen) due to the negative pressure of a compressor.

In conventional HFC refrigerants, simple replacement of such refrigerants can solve the problem. However, in hydrofluoropropene-containing refrigerants, oxidative degradation of the refrigerants may generate acid, which may corrode metal parts of the device, and thus necessitate equipment replacement.

Accordingly, to use a hydrofluoropropene as a refrigerant, a technique for enhancing the stability in the presence of air (oxygen) is necessary. For example, WO2008-27511 discloses that a stabilizer such as a phenolic compound, thiophosphate, benzoquinone, or aryl alkyl ether is added to a hydrofluoroolefin.

SUMMARY OF INVENTION

An object of the present invention is to provide a heat transport device in which a hydrohaloolefin-containing refrigerant is enclosed in a circulation route, the heat transport device being capable of reducing the influence of oxygen entrapped in the circulation route; and a heat transport method using the heat transport device.

Solution to Problem

As a result of extensive research to achieve the above object, the present inventors found that the above object can be achieved by a specific heat transport device in which an acid scavenger and/or an antioxidant is/are present in a refrigerant circulation route. Based on this finding, the present invention was accomplished.

Specifically, the present invention relates to the following heat transport device and heat transport method using the device.

A heat transport device comprises a circulation route enclosing a refrigerant containing at least one of hydrofluoroolefins (HFOs), hydrochlorofluoroolefins (HCFOs), or hydrochloroolefins (HCOs), The circulation route includes a stabilizer container containing an acid scavenger and/or an antioxidant, the antioxidant being at least one member selected from the group consisting of alkylcatechols, alkoxyphenols, benzoquinones, phenothiazines, and phthalates; and the acid scavenger being at least one member selected from the group consisting of aliphatic alcohols, polyhydric alcohols, amines, terpenes, alkyl epoxides, and alkenyl tolyls.

In the heat transport device described above, the stabilizer container can be disposed between a condenser and an evaporator in the circulation route.

In the heat transport device described above the stabilizer container can be composed of a drier.

In the heat transport device described above, the refrigerant can comprise 1-chloro-3,3,3-trifluoropropene.

In the heat transport device described above, the circulation route can comprise refrigerant oil in addition to the refrigerant, and the amount of the refrigerant oil is 5 parts by weight or less per 100 parts by weight of the refrigerant.

The heat transport device described above further includes a bearing supporting an axis of a motor driving a compressor part that compresses the refrigerant in a compressor, and the bearing can be a magnetic bearing, a ceramic bearing, or an air bearing.

The heat transport device described above can include a turbo compressor.

In the heat transport device described above, the device can be operated at 3.0 MPa or less.

In addition, the invention relates to a heat transport method comprising circulating the refrigerant in the circulation route of the heat transport device described above.

In the heat transport device and the heat transport method using the heat transport device according to the present invention, an acid scavenger and/or an antioxidant is/are present in the refrigerant circulation route. Accordingly, oxidative degradation of the refrigerant caused by oxygen entrapped in the circulation route can be prevented and/or acids generated in the circulation route can be scavenged, thus reducing oxygen influence against the refrigerant.

DETAILED DESCRIPTION OF THE INVENTION

Heat Transport Device of the Present Invention

In the heat transport device of the present invention, a refrigerant (hereinbelow a refrigerant mixture is also abbreviated as "refrigerant") comprising at least one of hydrofluoroolefins (HFOs), hydrochlorofluoroolefins (HCFOs), or hydrochloroolefins (HCOs) is enclosed in the refrigerant circulation route in the device, and heat is transferred by passing through each device disposed in the circulation route.

The purpose of the heat transport device is not limited. A wide variety of applications include air conditioners (mobile air conditioners, domestic air conditioners, and air conditioners for business use), refrigerating machines, refrigerators, coolers (chillers), container refrigerating apparatus, and heat transport apparatus, such as hot-water supply systems. A specific example of the heat transport device of the present invention is explained below with reference to the air conditioner (see FIG. 1) or the turbo refrigerating machine (see FIG. 2), which is one of the compression heat transport devices.

Embodiments of the heat transport device of the present invention are explained below.

The heat transport device according to the embodiment of the present invention is a heat transport device in which a refrigerant comprising at least one of hydrofluoroolefins (HFOs), hydrochlorofluoroolefins (HCFOs), or hydrochloroolefins (HCOs) is enclosed in the circulation route. A stabilizer container comprising an acid scavenger and/or antioxidant is disposed in the circulation route. The antioxidant is at least one member selected from the group consisting of alkylcatechols, alkoxyphenols, benzoquinones, phenothiazines, and phthalates, and the acid scavenger is at least one member selected from the group consisting of aliphatic alcohols, polyhydric alcohols, amines, terpenes, alkyl epoxides, and alkenyl tolyls.

The refrigerant comprises at least one of HFOs, HCFOs, or HCOs. Examples of HFOs include 2,3,3,3-tetrafluoropropene (HFO-1234yf), 1,3,3,3-tetrafluoropropene (HFO-1234ze), 1,2,3,3-tetrafluoropropene (HFO-1234ye), 1,1,2,3-tetrafluoropropene (HFO-1234yc), 1,2,3,3,3-pentafluoropropene (HFO-1225ye), 1,1,3,3,3-pentafluoropropene (HFO-1225zc), 3,3,3-trifluoropropene (HFO-1243zf), 1,1,1,4,4,4-hexafluoro-2-butene (HFO-1336mzz), 1,1,1,2,4,4,5,5,5-nonafluoropentene (HFO-1429myz), etc.

Examples of HCFOs include 2-chloro-3,3,3-trifluoropropene (HCFO-1233xf), 2,3-dichloro-3,3-difluoropropene (HCFO-1232xf), 1-chloro-3,3,3-trifluoropropene (HCFO-1233zd), 2-chloro-3,3,3-trifluoropropene (HCFO-1233xf), 2,3-dichloro-3,3-difluoropropene (HCFO-1232xf), 1,2-dichloro-3,3,3-trifluoropropene (HCFO-1223xd), 1,2,3-trichloro-3,3-difluoropropene (HCFO-1222xd), 2,3,3-trichloro-3-fluoropropene (HCFO-1231xf), etc.

Examples of HCOs include 1,3,3,3-tetrachloropropene (HCO-1230zd), 1,1,2,3-tetrachloropropene (HCO-1230xa), 1,1,3,3-tetrachloropropene (HCO-1230za), 2,3,3,3-tetrachloropropene (HCO-1230xf), etc.

These HFOs, HCFOs, and HCOs can be used singly or as a mixture of two or more. It is possible to mix refrigerants other than HFOs, HCFOs, and HCOs. In this case, adjusting the total amount of HFOs, HCFOs, and HCOs in the refrigerant mixture to 50 wt % or more is preferable. In the present invention, the refrigerant or refrigerant mixture is preferably composed of at least one of HFOs, HCFOs, or HCOs.

Figure 1:
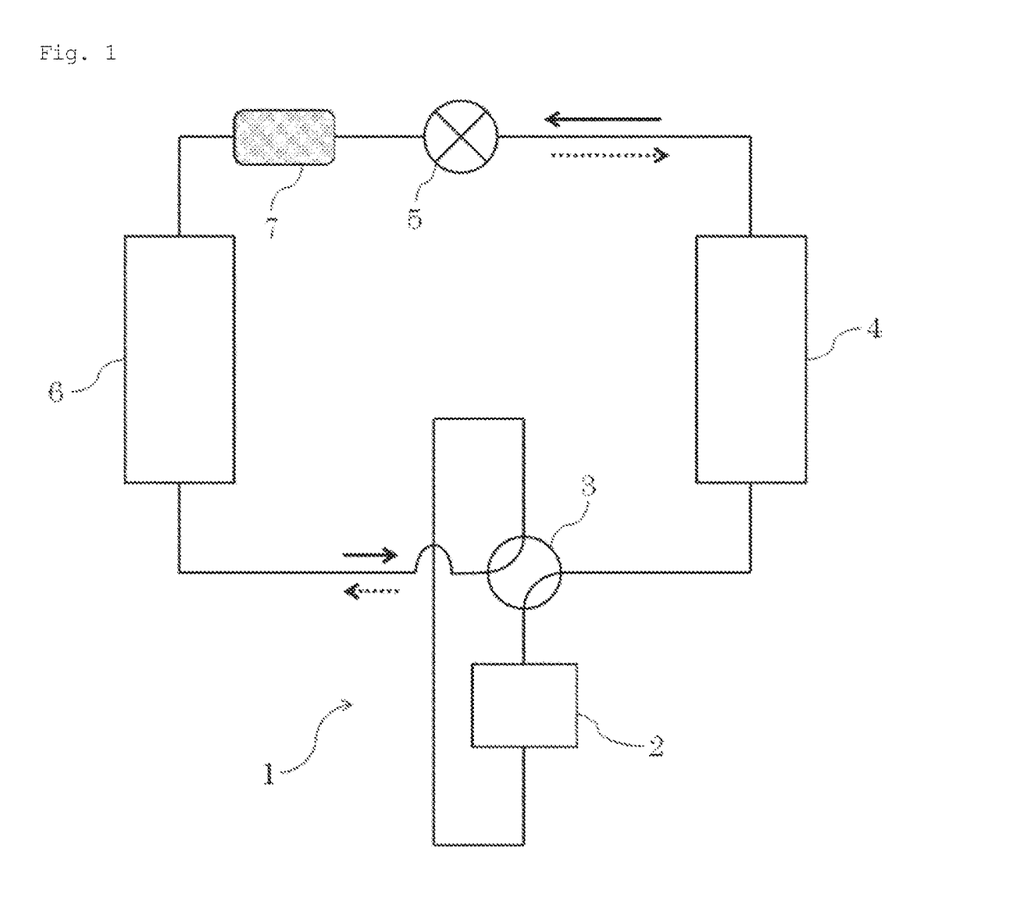
FIG. 1 shows an embodiment of a refrigerant circulation route in an air conditioner, which is one embodiment of the heat transport device according to the present invention.

FIG. 1 shows an embodiment of the refrigerant circulation route when the air conditioner 1 is used as a heat transport device. The air conditioner 1 mainly consists of a compressor 2, a four-way switching valve 3, an outdoor heat exchanger 4, an expansion mechanism 5, and an indoor heat exchanger 6. In FIG. 1, the solid arrow indicates the refrigerant circulation direction during cooling while the dotted arrow indicates the refrigerant circulation direction during heating. The refrigerant circulation direction can be controlled by allowing the refrigerant discharged from the compressor 2 to select the outdoor heat exchanger 4 direction or indoor heat exchanger 6 direction using the four-way switching valve 3.

The refrigeration cycle of the air conditioner 1 during cooling is explained. First, the compressor 2 compresses a low-pressure gas refrigerant and discharges a high-pressure gas refrigerant. The refrigerant discharged from the compressor 2 passes through the four-way switching valve 3 and is supplied to the outdoor heat exchanger 4. The outdoor heat exchanger 4 condenses a high-pressure gas refrigerant and discharges a high-pressure liquid refrigerant. The refrigerant discharged from the outdoor heat exchanger 4 passes through the expansion valve of the expansion mechanism 5 and becomes a refrigerant in the low-pressure gas-liquid mixing state. The refrigerant is then supplied to the indoor heat exchanger 6. The indoor heat exchanger 6 allows the refrigerant in the low-pressure gas-liquid mixing state to evaporate, and discharges a low-pressure gas refrigerant. The low-pressure gas refrigerant discharged from the indoor heat exchanger 6 is supplied to the compressor 2. This refrigeration cycle can cool a room.

During cooling, the outdoor heat exchanger 4 functions as a condenser and the indoor heat exchanger 6 functions as an evaporator. Specifically, evaporative latent heat of a refrigerant generated in the indoor heat exchanger 6 cools a room. On the other hand, during heating, by switching the four-way switching valve 3, the outdoor heat exchanger 4 functions as an evaporator and the indoor heat exchanger 6 functions as a condenser. Specifically, condensed latent heat of a refrigerant generated in the indoor heat exchanger 4 heats a room.

The air conditioner 1 includes a stabilizer container 7 present in the refrigerant circulation route. The stabilizer container 7 includes an acid scavenger and/or an antioxidant by storing a solid acid scavenger and/or antioxidant inside the container as a stabilizer. The antioxidant prevents oxidative degradation of the refrigerant. The acid scavenger scavenges acids such as fluoric acid generated by oxidative degradation of the refrigerant to inhibit degradation of refrigerant oil or metallic corrosion of the apparatus caused by the acids. The stabilizer container 7 is disposed in the circulation route in a manner such that the refrigerant flowing in the circulation route passes inside the stabilizer container 7 and is returned to the circulation route again. Because the refrigerant mixes the acid scavenger and/or the antioxidant when passing inside the stabilizer container 7, oxidative degradation of the refrigerant caused by oxygen entrapped in the circulation route is prevented and/or acids generated in the circulation route are scavenged.

Examples of the antioxidant include at least one member selected from the group consisting of alkyl catechols, alkoxy phenols, benzoquinones, phenothiazins, and phthalates.

Examples of alkylcatechols include pyrocatechol compounds represented by Formula (1):

(1)

wherein $R^1$ is alkyl and n is an integer of 1 to 4.

Examples of alkyl groups represented by $R^1$ include $C_1$ to $C_{10}$ linear, branched, or cyclic alkyl groups. Specific examples thereof include methyl, ethyl, propyl, isopropyl, n-butyl, isobutyl, sec-butyl, tert-butyl, pentyl, hexyl, cyclopropyl, cyclobutyl, cyclopentyl, and cyclohexyl. Tert-butyl is preferable.

n is preferably 1 or 2, and is more preferably 1. When n is an integer of 2 to 4, the groups represented by $R^1$ may be the same or different. Although $R^1$ may be bonded to any position on the benzene ring, $R^1$ is preferably bonded to the 4- or 5-position.

A preferable example of alkylcatechol is 4-tert-butylpyrocatechol.

Examples of alkoxyphenols include phenolic compounds represented by Formula (2):

(2)

wherein $R^2$ is an alkyl group, and m is an integer of 1 to 5.

Examples of the alkyl group represented by $R^2$ include $C_1$ to $C_{10}$ linear, branched, or cyclic alkyl groups. Specific examples thereof include methyl, ethyl, propyl, isopropyl, n-butyl, isobutyl, sec-butyl, and tert-butyl. Methyl, ethyl, isopropyl, and tert-butyl are preferable. m is preferably 1 or 2, and more preferably 1. When n is an integer of 2 to 4, the groups represented by $R^2O$ may be the same or different. Although $R^2O$ may be bonded to any position on the benzene ring, $R^2O$ is preferably bonded to the p-position (4-position).

A preferable example of alkoxyphenol is 4-methoxyphenol.

Examples of benzoquinones include quinone compounds represented by Formula (3):

(3)

wherein $R^3$ is an alkyl group, and p is an integer of 1 to 4.

Examples of alkyl groups represented by $R^3$ include $C_1$ to $C_{10}$ linear, branched, or cyclic alkyl groups. Specific examples thereof include methyl, ethyl, propyl, isopropyl, n-butyl, isobutyl, sec-butyl, and tert-butyl. Methyl, ethyl, isopropyl, and tert-butyl are preferable.

p is preferably 0, 1, or 2, and more preferably 0. When n is an integer of 2 to 4, groups represented by $R^3$ may be the same or different. $R^3$ may be bonded to any position on the ring.

A preferable example of benzoquinone is 1,4-benzoquinone.

Examples of phenothiazines include phenothiazine compounds represented by Formula (4):

wherein $R^4$ is a hydrogen atom or an alkyl group, the groups represented by $R^5$ or the groups represented by $R^6$ may be the same or different, and each represents a hydrogen atom or an alkyl group, q and r may be the same or different, and each represents an integer of 1 to 4.

Examples of alkyl groups represented by $R^4$ include $C_1$ to $C_{10}$ linear, branched, or cyclic alkyl groups. Specific examples thereof include methyl, ethyl, propyl, isopropyl, n-butyl, isobutyl, sec-butyl, and tert-butyl. Methyl, ethyl, isopropyl, and tert-butyl are preferable. $R^4$ is preferably a hydrogen atom.

Alkyl groups represented by $R^5$ and RE can be suitably selected from those represented by $R^4$. Preferably, both $R^5$ and $R^6$ are hydrogen atoms.

q and r are preferably 0, 1, or 2, and more preferably 0. When q is an integer of 2 to 4, the groups represented by $R^5$ may be the same or different. When r is an integer of 2 to 4, the groups represented by $R^6$ may be the same or different. $R^5$ and $R^6$ may be bonded to any position on the ring.

A preferable example of phenothiazine is a phenothiazine.

Examples of phthalates include mono- or di-alkali metal salts of phthalic acid. Mono-alkali metal salts of phthalic acid are preferable. Specific examples thereof include potassium hydrogen phthalate and sodium hydrogen phthalate. Potassium hydrogen phthalate is preferable.

As the antioxidant, alkyl catechols, alkoxy phenols, benzoquinones, phenothiazins, and phthalates can be used alone or as a mixture of two or more.

As an acid scavenger, at least one member selected from the group consisting of aliphatic alcohols, polyhydric alcohols, amines, terpenes, alkyl epoxides, and alkenyl tolyls can be used.

Examples of aliphatic alcohols (monovalent) include $C_1$ to $C_4$ linear or branched alcohols. The alkyl group of alcohol may include an ether bond. Specific examples thereof include methanol, ethanol, (n-, iso-)propyl alcohol, (n-, sec-, tert-)butanol, etc. Methanol, isopropyl alcohol, sec-butanol, and tert-butanol are preferable.

Examples of polyhydric alcohols include $C_2$ to $C_4$ alcohols having 2 to 4 hydroxy groups. The hydrocarbon chain in the alcohol may include an ether bond. Specific examples thereof include ethylene glycol, propylene glycol, glycerol, erythritol, etc. Ethylene glycol is preferable.

Examples of amines include primary, secondary, and tertiary amine compounds substituted with a $C_2$ to $C_5$ alkyl group or phenyl. Specific examples thereof include triethylamine, tributylamine, aniline, and diphenylamine. Triethylamine and aniline are preferable.

Examples of terpenes include isoprene, myrcene, alloocimene, beta ocimene, terpene, d-limonene, retinal, pinene, menthol, etc. Isoprene and d-limonene are preferable.

Examples of alkyl epoxides include epoxy compounds substituted with a $C_4$ to $C_5$ alkyl group. Specific examples thereof include 1,2-butylene oxide, 1,2-isobutyleneoxide, 1,2-pentyloxide, 1,2-isopentyloxide, and 1,2-tert-pentyloxide. 1,2-Butylene oxide is preferable.

Examples of alkenyl tolyls include tolyl compounds in which one $C_2$ to $C_4$ alkenyl group is substituted. Specific examples include 2-methylstyrene, 3-methylstyrene, 4-methylstyrene, 4-propenyltoluene, 4-isopropenyl toluene, etc. 4-Isopropenyl toluene is preferable.

As an acid scavenger, aliphatic alcohols, polyhydric alcohols, amines, terpenes, alkyl epoxides, and alkenyl tolyls can be used singly or as a mixture of two or more.

The amount of the antioxidant is usually 0.1 to 5.0 parts by weight and preferably 0.3 to 3.0 parts by weight, per 100 parts by weight of the total amount of HFOs, HCFOs, and HCOs. The amount of the acid scavenger is usually 0.005 to 5 parts by weight and preferably 0.01 to 1 part by weight, per 100 parts by weight of the total amount of HFOs, HCFOs, and HCOs.

The position of the stabilizer container 7 in the circulation route is not limited. The stabilizer container 7 is preferably disposed between the evaporator and the condenser between which the refrigerant flows in the circulation route as a liquid refrigerant. Specifically, the stabilizer container 7 is preferably disposed between the outdoor heat exchanger 4 and the expansion mechanism 5 or between the indoor heat exchanger 6 and the expansion mechanism 5. During cooling, the outdoor heat exchanger 4 functions as a condenser and the indoor heat exchanger 6 functions as an evaporator. During heating, the outdoor heat exchanger 4 functions as an evaporator and the indoor heat exchanger 6 functions as a condenser. In either case of cooling or heating, the liquid refrigerant is present between the expansion mechanism 5 and the outdoor heat exchanger 4 or between the expansion mechanism 5 and the indoor heat exchanger 6. Thus, as the liquid refrigerant passes through the stabilizer container 7, oxidation of the refrigerant can be efficiently prevented and acids in the circulation route can be efficiently scavenged.

The stabilizer container 7 may be disposed between the outdoor heat exchanger 4 and the expansion mechanism 5 or between the indoor exchanger 6 and the expansion mechanism 5. When one stabilizer container 7 is disposed in the circulation route, it is preferable to store both an acid scavenger and an antioxidant in the stabilizer container 7. Alternatively, as the stabilizer container 7, two stabilizer containers, i.e., one including an acid scavenger and the other including an antioxidant, can be disposed in the circulation route.

Figure 2:
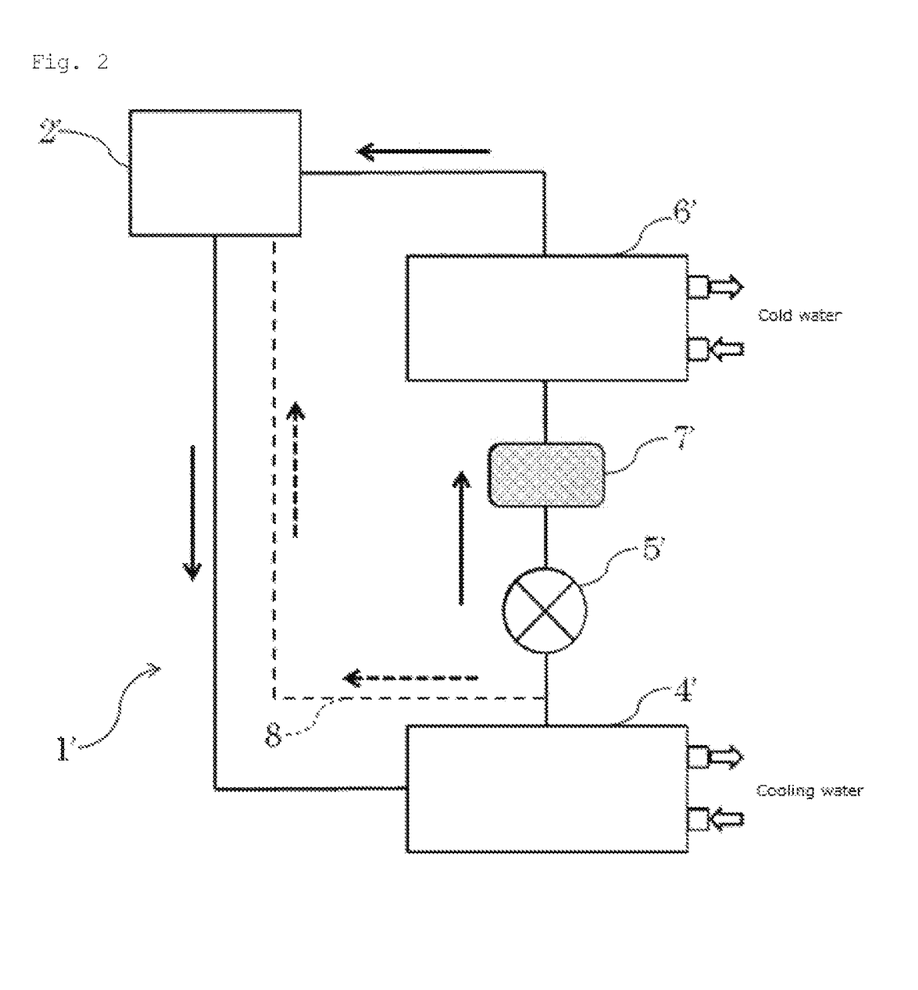
FIG. 2 shows an embodiment of a refrigerant circulation route in a turbo refrigerating machine, which is another embodiment of the heat transport device according to the present invention.

In FIG. 1 mentioned above, the air conditioner 1 is used as an example of the heat transport device; however, a turbo refrigerating machine 1' shown in FIG. 2 can be used as the heat transport device. FIG. 2 shows an embodiment of a refrigerant circulation route in the turbo refrigerating machine 1'. The turbo refrigerating machine 1' mainly consists of a compressor 2', a condenser 4', an expansion mechanism 5', and an evaporator 6'.

The solid arrow in FIG. 2 shows the refrigerant circulation direction. Specifically, the compressor 2' compresses a low-pressure gas refrigerant and discharges a high-pressure gas refrigerant. The refrigerant discharged from the compressor 2' is supplied to the condenser 4'. The condenser 4' condenses a high-pressure gas refrigerant and discharges a high-pressure liquid refrigerant. The refrigerant discharged from the condenser 4' passes through the expansion valve of the expansion mechanism 5' and becomes a refrigerant in the low-pressure gas-liquid mixing state. The refrigerant is then supplied to the evaporator 6'. The evaporator 6' allows the refrigerant in the low-pressure gas-liquid mixing state to evaporate and discharges a low-pressure gas refrigerant. The low-pressure gas refrigerant discharged from the evaporator 6' is supplied to the compressor 2'. Cool wind formed of cool water generated by this refrigeration cycle is used for cooling a large-scale space.

The turbo refrigerating machine 1' also includes the stabilizer container 7' present in the refrigerant circulation route. Since the stabilizer container 7' is as explained above, detailed explanation is omitted here. The position of the stabilizer container 7' in the circulation route is not limited. The stabilizer container is preferably disposed between the evaporator 4' and the condenser 6' between which the refrigerant flows in the circulation route as a liquid refrigerant. Specifically, the stabilizer container 7' is preferably disposed between the condenser 4' and the expansion mechanism 5' or between the evaporator 6' and the expansion mechanism 5'. Thus, the liquid refrigerant passes through the stabilizer container 7', the oxidation of the refrigerant can be efficiently prevented and acids in the circulation route can be efficiently scavenged.

When the circulation route includes an injection line 8 (dashed line in FIG. 2) and an economizer (not shown), the stabilizer container 7 may be disposed on the injection line 8 from the condenser 4' to the compressor 2'.

The stabilizer container 7' may be disposed between the condenser 4' and the expansion mechanism 5', between the evaporator 6' and the expansion mechanism 5', or at any position on the injection line 8. When one stabilizer container 7' is disposed in the circulation route, it is preferable to store both an acid scavenger and an antioxidant in the stabilizer container 7'. As the stabilizer container 7', two stabilizer containers, i.e., one including an acid scavenger and the other including an antioxidant, can be disposed in the circulation route.

In either of the embodiments shown above, the stabilizer container 7 or 7' may be a special device containing an acid scavenger and/or an antioxidant as the stabilizer. A drier or the like can be used as a stabilizer container containing an acid scavenger and/or an antioxidant by storing a solid acid scavenger and/or antioxidant in a drying device (drier) provided in the refrigerant circulation route of a known heat transport device, or by immersing a liquid acid scavenger and/or antioxidant in a drying agent in the drier.

In the heat transport device according to an embodiment of the present invention, valves are provided before and after the stabilizer container 7 or 7', and the stabilizer container 7 or 7' is removably mounted on the circulation route so that the acid scavenger or antioxidant in the stabilizer container 7 or 7' is easily removed or exchanged. Both manual and electric valves can be used as long as the valves are provided in the circulation route in a manner such that the flow of the refrigerant against the stabilizer container 7 or 7' can be controlled. Manual and electric valves are both usable.

The embodiments of the heat transport device of the present invention are explained above; however, the heat transport device of the present invention is not limited to these embodiments. Various modifications are possible as long as the gist of the present invention is not deviated from.

For example, the heat transport device of the present invention can be operated at a low pressure of 3.0 MPa or less, and preferably 1.0 MPa or less.

The heat transport device of the present invention can use a magnetic bearing, a ceramic bearing, or an air bearing as a bearing that supports the axis of a motor driving the compression part compressing the refrigerant in the compressor. Thereby, an oil-free heat transport device in which the amount of the refrigerant oil to be used is limited to 5 parts by weight or less per 100 parts by weight of the refrigerant can be attained, and a turbo compressor for use in chillers can be provided. The above bearing does not require refrigerant oil for improving lubricity of the bearing in addition to the refrigerant, and the amount of the refrigerant oil can be substantially set to 0 parts by weight. However, considering oil (grease etc.) entrapped during the construction of the heat transport device, the amount of the refrigerant oil is preferably 5 parts by weight or less.

Heat Transport Method of the Present Invention

The heat transport method of the present invention can be performed by circulating the refrigerant in the refrigerant circulation route of the heat transport device according to the present invention.

EXAMPLES

The present invention is explained in detail below with reference to Examples and Comparative Examples. However, the present invention is not limited to the Examples.

Examples 1 to 36 and Comparative Examples 1 and 2

Preparation of Refrigerant

HCFO-1233zd (E) was used as a refrigerant. 100 g of a stabilizer was used per 100 kg of the refrigerant. In Examples 1 to 6, an antioxidant alone was used as a stabilizer and in Examples 7 to 36, an antioxidant and an acid scavenger were used as a stabilizer. Of Examples 7 to 36 in which an antioxidant and an acid scavenger were used as a stabilizer, the weight ratio of the antioxidant and the acid scavenger (i) was 9:1 in Examples 7 to 12 and 25 to 30, while the weight ratio of the antioxidant, acid scavenger (i), and acid scavenger (ii) was 8:1:1 in Examples 13 to 18 and 31 to 36. The antioxidants and acid scavengers used in the Examples are shown in Table 1 below.

5 kg of refrigerant oil mainly consisting of a polyvinyl ether-based compound having a constitutional unit represented by Formula (5) below and having a kinematic viscosity at 40° C. of about 70 mm²/s was prepared as refrigerant oil.

(5)

TABLE 1

| | | Acid scavenger | |
| | Antioxidant | (i) | (ii) |
|---|---|---|---|
| Comparative Example 1 | — | — | — |
| Comparative Example 2 | — | — | — |
| Example 1 | 2,6-Di-tert-butyl-4-methylphenol | — | — |
| Example 2 | 4-Tert-butylcatechol | — | — |
| Example 3 | 4-Methoxyphenol | — | — |
| Example 4 | 1,4-Benzoquinone | — | — |

TABLE 1-continued

| | Antioxidant | Acid scavenger (i) | (ii) |
|---|---|---|---|
| Example 5 | Phenothiazine | — | — |
| Example 6 | Potassium hydrogen phthalate | — | — |
| Example 7 | 2,6-Di-tert-butyl-4-methylphenol | Isopropanol | — |
| Example 3 | 4-Tert-butylcatechol | p-Isopropenyltoluene | — |
| Example 9 | 4-Methoxyphenol | d-Limonene | — |
| Example 10 | 1,4-Benzoquinone | 1,2-Butylene oxide | — |
| Example 11 | Phenothiazine | Ethylene glycol | — |
| Example 12 | Potassium hydrocen phthalate | Isopropanol | — |
| Example 13 | 2,6-Di-tert-butyl-4-methylphenol | p-Isopropenyltoluene | Triethylamine |
| Example 14 | 4-Tert-butylcatechol | p-Isopropenyltoluene | Triethylamine |
| Example 15 | 4-Methoxyphenol | p-Isopropenyltoluene | Triethylamine |
| Example 16 | 1,4-Benzoquinone | p-Isopropenyltoluene | Triethylamine |
| Example 17 | Phenothiazine | p-Isopropenyltoluene | Triethylamine |
| Example 18 | Potassium hydrogen phthalate | p-Isopropenyltoluene | Triethylamine |
| Example 19 | 2,6-Di-tert-butyl-4-methylphenol | — | — |
| Example 20 | 4-Tert-butylcatechol | — | — |
| Example 21 | 4-Methoxyphenol | — | — |
| Example 22 | 1,4-Benzoquinone | — | — |
| Example 23 | Phenothiazine | — | — |
| Example 24 | Potassium hydrogen phthalate | — | — |
| Example 25 | 2,6-Di-tert-butyl-4-methylphenol | Isopropanol | — |
| Example 26 | 4-Tert-butylcatechol | p-Isopropenyltoluene | — |
| Example 27 | 4-Methoxyphenol | d-Limonene | — |
| Example 28 | 1,4-Benzoquinone | 1,2-Butylene oxide | — |
| Example 29 | Phenothiazine | Ethylene glycol | — |
| Example 30 | Potassium hydrogen phthalate | Isopropanol | — |
| Example 31 | 2,6-Di-tert-butyl-4-methylphenol | p-Isopropenyltoluene | Triethylamine |
| Example 32 | 4-Tert-butylcatechol | p-Isopropenyltoluene | Triethylamine |
| Example 33 | 4-Methoxyphenol | p-Isopropenyltoluene | Triethylamine |
| Example 34 | 1,4-Benzoquinone | p-Isopropenyltoluene | Triethylamine |
| Example 35 | Phenothiazine | p-Isopropenyltoluene | Triethylamine |
| Example 36 | Potassium hydrogen phthalate | p-Isopropenyltoluene | Triethylamine |

A total of 38 kinds (Examples 1 to 36 and Comparative Examples 1 and 2) of refrigerants shown in Table 1 were individually enclosed in the circulation route of the turbo refrigerating machine shown in FIG. 2, and stabilizers were stored in a stabilizer container. The turbo refrigerating machine was operated for a certain period of time (Examples 1 to 18 and Comparative Example 1: 330 hours; Examples 19 to 36 and Comparative Example 2: 1000 hours). The refrigerants after operation were taken as samples, and the total acid numbers of gases and oil refrigerants were measured by a neutralization titration method. Table 2 shows the measurement results.

| | TAN (mg · KOH/g) | |
|---|---|---|
| | Gas | Oil |
| Comparative Example 1 | 0.95 | 1.40 |
| Comparative Example 2 | 3.10 | 4.65 |
| Example 1 | 0.10 | 0.15 |
| Example 2 | 0.10 | 0.14 |
| Example 3 | 0.14 | 0.15 |
| Example 4 | 0.24 | 0.30 |
| Example 5 | 0.10 | 0.35 |
| Example 6 | 0.15 | 0.21 |
| Example 7 | 0.01 | 0.07 |
| Example 8 | 0.02 | 0.08 |
| Example 9 | 0.05 | 0.10 |
| Example 10 | 0.04 | 0.15 |
| Example 11 | 0.10 | 0.15 |
| Example 12 | 0.01 | 0.018 |
| Example 13 | 0.02 | 0.08 |
| Example 14 | 0.01 | 0.09 |
| Example 15 | 0.01 | 0.08 |
| Example 16 | 0.10 | 0.15 |
| Example 17 | 0.04 | 0.15 |
| Example 18 | 0.01 | 0.07 |
| Example 19 | 0.45 | 0.70 |
| Example 20 | 0.46 | 0.93 |
| Example 21 | 0.78 | 0.94 |
| Example 22 | 1.09 | 1.40 |
| Example 23 | 0.78 | 1.63 |
| Example 24 | 0.60 | 0.94 |
| Example 25 | 0.15 | 0.48 |
| Example 26 | 0.14 | 0.47 |
| Example 27 | 0.30 | 0,95 |
| Example 28 | 0.47 | 0.93 |
| Example 29 | 0.62 | 0.25 |
| Example 30 | 0.15 | 0.46 |
| Example 31 | 0.14 | 0.24 |
| Example 32 | 0.16 | 0.33 |
| Example 33 | 0.14 | 0.42 |
| Example 34 | 0.46 | 1.16 |
| Example 35 | 0.30 | 0.83 |
| Example 36 | 0.16 | 0.36 |

A comparison between Comparative Example 1 and Examples 1 to 18 indicates that the total acid number was reduced to about 1/20 or less when the operation time was 330 hours. A comparison between Comparative Example 2 and Examples 19 to 36 indicates that the total acid number was reduced to about 1/10 or less when the operation time was 1000 hours. This indicates that the stabilizer container exhibits inhibitory effects. Further, Examples 1 to 6 and Examples 7 to 18, and Examples 19 to 24 and Examples 25 to 36 were compared. Specifically, Examples using the same kind of antioxidant were compared between the case in which the antioxidant alone was used as the stabilizer and the case in which the antioxidant and acid scavenger(s) were used as the stabilizer. The results indicate that the total acid number was substantially reduced when the antioxidant and the acid scavenger(s) were used as the stabilizer. This indicates that the use of the antioxidant and the acid scavenger(s) as the stabilizer attained higher inhibitory effects of the stabilizer container.

The above results confirmed that by the stabilizer, a refrigerant containing a hydrohaloolefin, such as 1-chloro-3,3,3-trifluoro propene, can exhibit stability against oxygen even in the presence of air (oxygen). Accordingly, the present invention is found to be useful as a heat transport device and a heat transport method that exhibit the stability equivalent to that of conventional HFC refrigerants, and exert very little effect on the global environment.

DESCRIPTION OF REFERENCE NUMERALS

1 Air conditioner (Heat transport device)
1' Turbo refrigerating machine (Heat transport device)
2 Compressor
2' Compressor
3 Four-way switching valve
4 Outdoor heat exchanger 4' Condenser
5 Expansion mechanism
5' Expansion mechanism
6 Indoor heat exchanger
6' Evaporator
7 Stabilizer container
7' Stabilizer container

The invention claimed is:

1. A heat transport device comprising:
a circulation route enclosing a refrigerant containing at least one of hydrofluoroolefins (HFOs), hydrochlorofluoroolefins (HCFOs), or hydrochloroolefins (HCOs), wherein the circulation route includes:
   a condenser;
   an expansion mechanism;
   an evaporator;
   a compressor; and
   a stabilizer container containing an acid scavenger, the stabilizer container being located in the circulation route between the expansion mechanism and the evaporator in a refrigerant circulation direction, and the refrigerant enclosed in the circulation route and flowing through the stabilizer container consists essentially of refrigerant in a gas-liquid mixed state, the refrigerant enclosed in the circulation route and flowing from the expansion mechanism to the compressor being at a lower pressure than the refrigerant enclosed in the circulation route and flowing from the compressor to the expansion mechanism;
wherein the acid scavenger is at least one member selected from a group consisting of polyhydric alcohols, amines, alkyl epoxides, and alkenyl tolyls, and
wherein the heat transport device is a cooling water chiller.

2. The heat transport device according to claim 1, wherein the stabilizer container is composed of a drier.

3. The heat transport device according to claim 1, wherein the stabilizer container further contains an antioxidant, the antioxidant being at least one member selected from a group consisting of alkylcatechols, alkoxyphenols, benzoquinones, phenothiazines, and phthalates.

4. The heat transport device according to claim 1, wherein the acid scavenger is at least one member selected from a group consisting of polyhydric alcohols and amines, and the stabilizer container further contains an antioxidant being at least one member selected from a group consisting of alkylcatechols and alkoxyphenols.

5. The heat transport device according to claim 1, wherein the refrigerant comprises 1-chloro-3,3,3-trifluoropropene.

6. The heat transport device according to claim 1, wherein the circulation route comprises refrigerant oil in addition to the refrigerant, and the amount of the refrigerant oil is 5 parts by weight or less per 100 parts by weight of the refrigerant.

7. The heat transport device according to claim 6, further comprising a bearing supporting an axis of a motor driving a compressor part for compressing the refrigerant in the compressor, the bearing being a magnetic bearing, a ceramic bearing, or an air bearing.

8. The heat transport device according to claim 1, wherein the compressor is a turbo compressor.

9. The heat transport device according to claim 1, wherein the heat transport device is configured to be operated at 3.0 MPa or less.

10. A heat transport method comprising circulating the refrigerant in the circulation route of the heat transport device according to claim 1.

* * * * *